Oct. 3, 1967    R. J. DECKER    3,344,708
UNIVERSAL LENS MOUNTING

Filed April 15, 1966    3 Sheets-Sheet 1

INVENTOR.
RICHARD J. DECKER
BY
MORGAN, FINNEGAN, DURHAM & PINE
ATTORNEYS

Oct. 3, 1967 R. J. DECKER 3,344,708
UNIVERSAL LENS MOUNTING
Filed April 15, 1966 3 Sheets-Sheet 2

INVENTOR.
RICHARD J. DECKER
BY
MORGAN, FINNEGAN, DURHAM & PINE
ATTORNEYS

Oct. 3, 1967  R. J. DECKER  3,344,708
UNIVERSAL LENS MOUNTING
Filed April 15, 1966  3 Sheets-Sheet 3
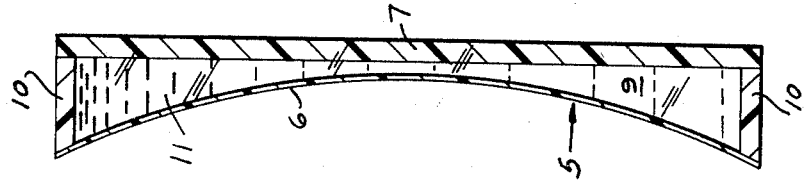
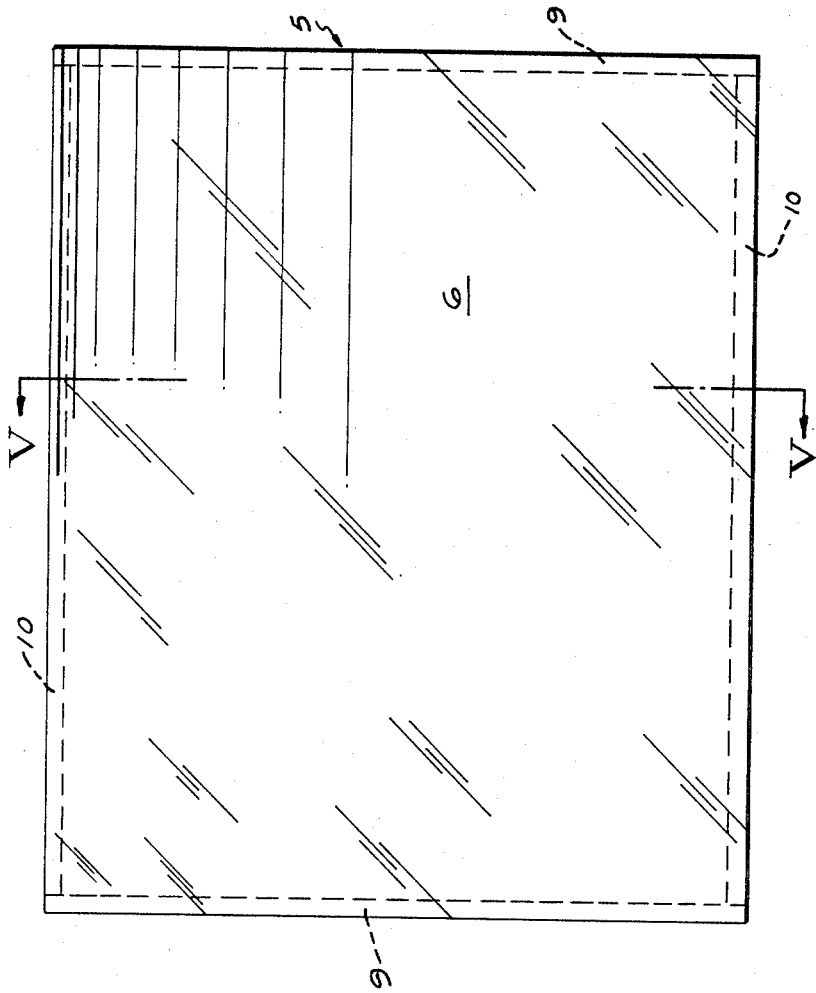
INVENTOR.
RICHARD J. DECKER
BY
MORGAN, FINNEGAN, DURHAM & PINE
ATTORNEYS United States Patent Office 3,344,708
Patented Oct. 3, 1967

3,344,708
UNIVERSAL LENS MOUNTING
Richard J. Decker, Huntington, N.Y., assignor to Electrographic Corporation, New York, N.Y., a corporation of Delaware
Filed Apr. 15, 1966, Ser. No. 542,822
4 Claims. (Cl. 88—24)

This invention relates to reproportioning lenses and more particularly to an adjustable mounting for a reproportioning lens attachable to a wide variety of reproduction equipment.

A reproportioning lens is one that changes the image in one dimension only. For example, where it is desirable to decrease the height of the copy while maintaining the width the same, this can conveniently be accomplished by the use of a reproportioning lens. The lens is placed relatively close to the work being reproduced and is, therefore, quite large.

The requirements for precision and accurate alignment in photographic and reproduction type equipment are well-known and become even more difficult to satisfy in a universally attachable lens mounting for a reproportioning lens. Such a mounting must be capable of attachment to a large variety of different types of equipment and must be capable of positioning the lens relative to the copy while maintaining the lens steady and parallel to the copy. The alignment must be sufficiently accurate and the mounting sufficiently steady to prevent undesirable distortion and related reproduction problems.

An object of this invention is to provide an inexpensive universal lens mounting for a reproportioning lens.

Another object is to provide a lens mounting that is easily attachable to many types of reproduction equipment and which is capable of adjustably positioning a reproportioning lens while maintaining it in steady accurate alignment.

These and other objects will become more apparent from the following detailed specification which sets forth an illustrative embodiment of the invention. The drawings form part of the specification wherein:

FIGURES 4 and 5 are plan and cross-sectional side views, respectively, of the reproportioning lens.

The universal reproportioning lens apparatus in accordance with the invention includes a bed mount which is secured in a position perpendicular to the image plane by means of a pair of suction cups. The reproportioning lens, which is preferably a Plexiglas, liquid filled structure, is maintained on a carriage adapted to slide on the bed mount surface. A pair of rack and pinion arrangements are used to position the carriage and maintain accurate alignment with respect to the bed mount and image plane. An additional suction cup is secured to a guide rod which, in turn, is slidably attached to the lens at a point spaced from the carriage. This slidable attachment does not interfere with movement of the lens during focusing, but still provides a steadying support for the lens.

Figure 1:
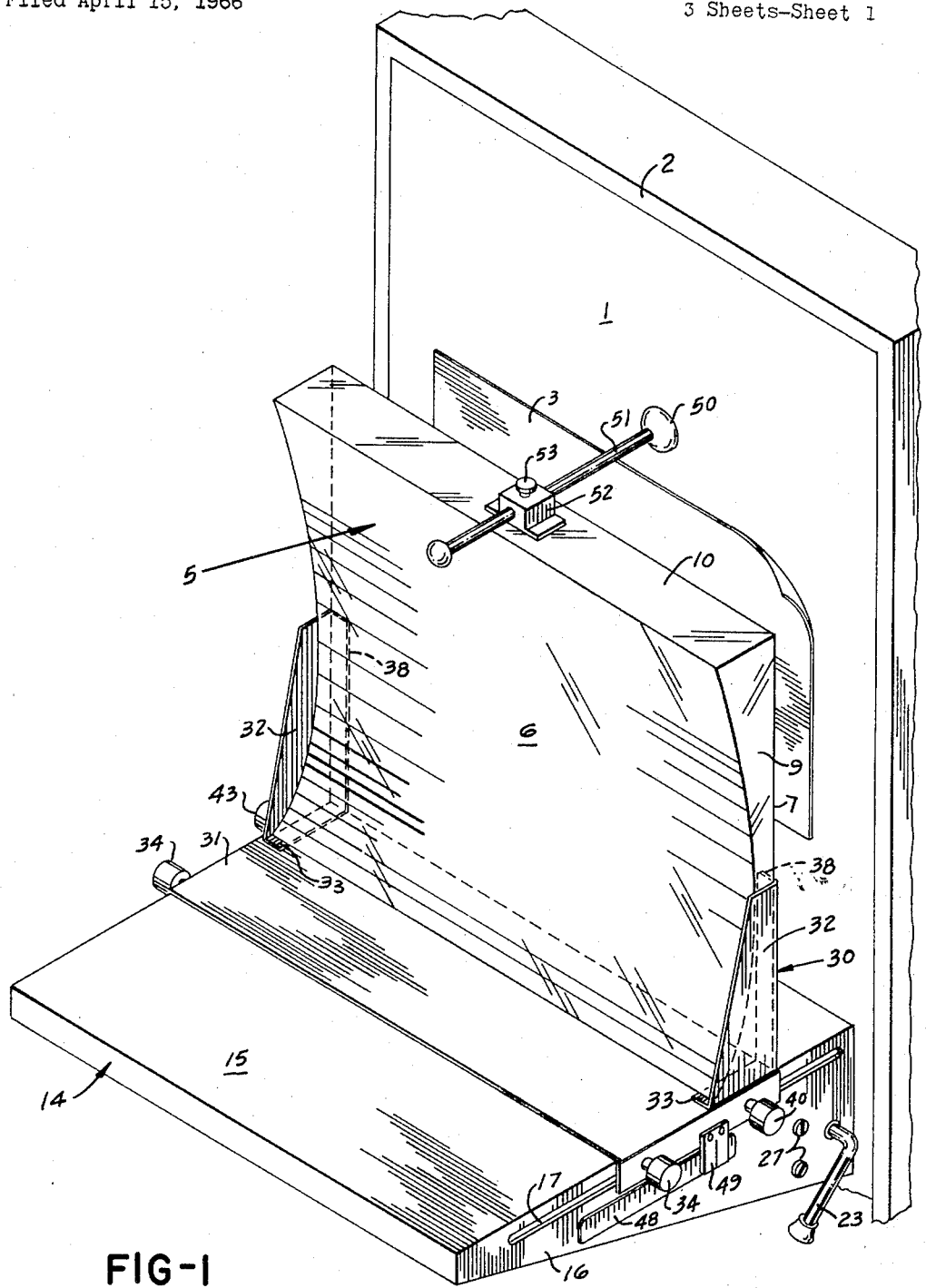
FIGURE 1 is a perspective view of the reproportioning lens and mounting structure attached to an image plane.

The work which is to be reproduced is shown as a sheet 3 and is placed on an image plane which includes a glass plate 1 in a suitable frame structure 2 as shown in FIGURE 1.

The concave reproportioning lens 5 is best seen in FIGURES 4 and 5 and includes a curved face piece 6 spaced from a planar back face piece 7. The side pieces 9 and end pieces 10 are secured to the edges of the back piece so they extend perpendicular thereto. Side pieces 9 are shaped in accordance with the desired curved configuration of face piece 6, and the free edges of end pieces 10 are beveled to likewise accommodate the curved face piece. The face pieces are preferably made from clear Plexiglas selected so that it is relatively free from surface imperfections, whereas the side and end pieces are made from opaque Plexiglas. The lens enclosure is constructed using a cement suitable for joining Plexiglas. The lens cavity 11 between the face piece 6 and back piece 7 is filled with transparent liquid such as mineral oil which has the proper refractory properties. After the cavity is filled, the lens structure is permanently sealed.

The reproportioning lens shown in FIGURES 4 and 5 has a simple concave configuration and, therefore, when placed before the work being copied, as shown in FIGURE 1 (that is between the work and the remainder of the reproducing apparatus) the lens reduces the height of the copy but does not affect the width. The copy can be illuminated by either reflected light or by back lighting through glass plate 1 of the image plane. Lens 5 is positionable to vary the distance between the lens and the work being copied while maintaining it parallel to the image plane, this being accomplished by the universal mounting structure which includes a bed mount 14 secured to the image plane by means of suction cups 20, and a positionable lens mount 30 which is movable relative to the bed surface.

The bed mount 14 is a sheet metal unit providing a flat bed surface 15 which is positioned perpendicular to the image plane. A pair of right triangular side panels 16 extend downwardly from the bed surface and each include therein a relatively long guide slot 17 running parallel to the edge of the bed surface.

Figures 2, 3:
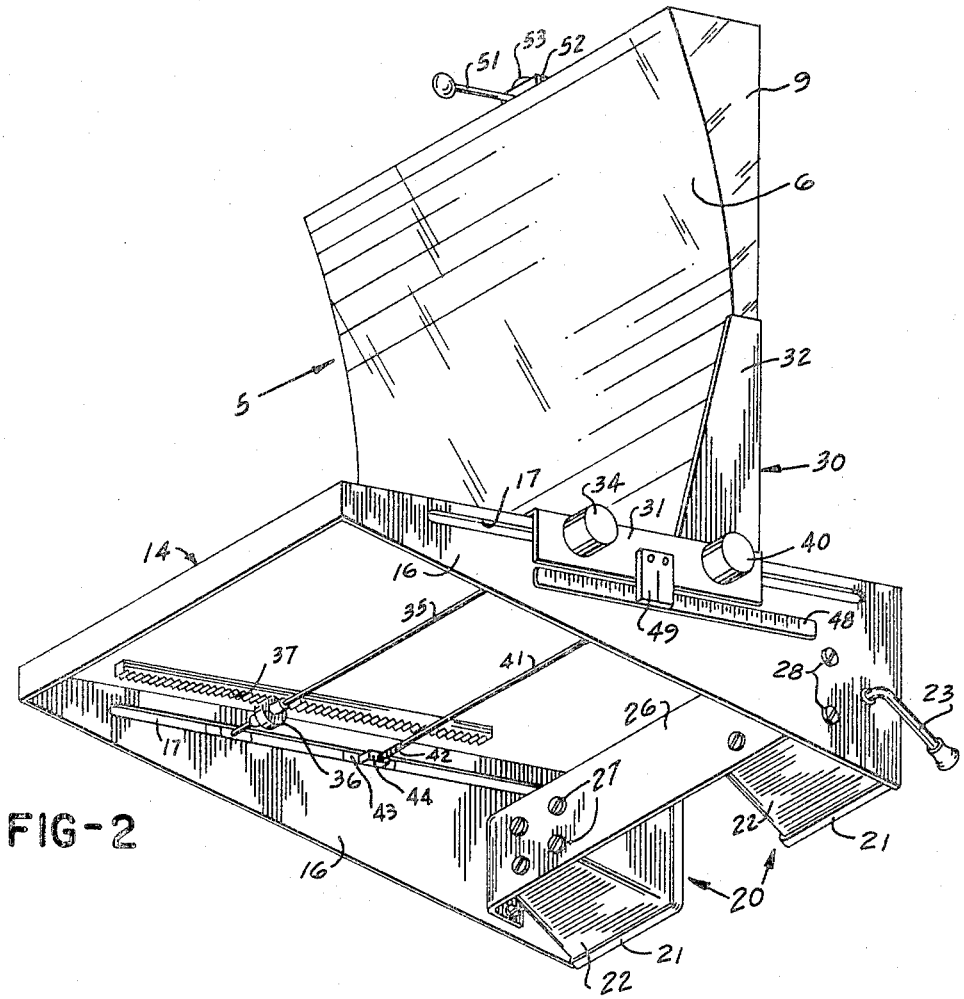
FIGURE 2 is a perspective view of the same showing the under portion of the bed mount.
FIGURE 3 is a perspective view, with portions broken away for clarity of illustration, of the suction cup unit attached to the bed mount.

The bed mount is secured to the image plane by a pair of suction cups 20 illustrated in FIGURE 3. The suction cups each include a housing 22 having one open side, the open side being covering by a rubber membrane 21 which fits over the free edge of the housing. A lever unit is journaled in the housing and extends in a direction generally parallel to membrane 21. One end thereof extends beyond the housing to provide a lever handle 23 which is a right angles to the remainder of the lever unit. An eccentric central portion 24 of the lever unit is attached to membrane 21 by means of a linkage 25. When the suction cup is placed against a flat surface, such as the image plane shown in FIGURE 1, and the lever is actuated, the rubber membrane is pulled away from the image plane to create a partial vacuum so that the suction cup adheres to the plane. Preferably, the eccentric portion 24 is positioned relative to lever handle 23 so as to provide an over-center action that will maintain the membrane in the withdrawn position even though no force is applied to lever handle 23. Housings 22 are secured to a suction cup mounting bracket 26 by means of screws 27 and the mounting bracket is secured between side panels 16 by means of screws 28. The suction cup membranes are flush with the free edge of the bed surface and the perpendicular free edges of the side panels.

The adjustable lens mount 30 includes a sheet metal carriage 31 having a flat central portion and downwardly extending flanges at the opposite ends thereof. The carriage is dimensioned to cooperate with the bed mount and has a width slightly greater than the width of the bed surface. The focusing and locking structure can be seen in FIGURE 2, and includes a pair of racks 37 secured to the under side of the bed surface, one rack near each side panel and parallel thereto. A rod 35 passes through guide slots 17, and is journaled in suitable apertures within the carriage flanges. Rigidly secured to rod 35 are two pinion gears 36 that cooperate respectively with the racks 37. A pair of focusing knobs 34 are attached to the free end of rod 35 that emerge from the carriage flanges. As the knobs are rotated the carriage moves relative to the bed mount while maintaining its accurate alignment parallel to the image plane.

A second rod 41 is part of the locking structure and similarly passes through guide slots 17. A knob 40 is attached to one end of the rod and the other end is threaded to screw into a rectangular projection 44 attached to carriage 31. The rectangular projection 44 passes through the guide slot and prevents rotation of knob 43. Thus, once a position is selected for the carriage by means of focusing knobs 34, the carriage can be locked in place by rotation of knob 40 which pulls the carriage flanges together into frictional engagement with side panels 16. A scale 48 is attached to one of the side panels and a cooperating indicator 39 is attached to the carriage.

A pair of right triangular upright sheet metal lens supports 32 support lens 5 in an upright position perpendicular to the carriage and bed surface. The lens supports are secured to the carriage by means of flanges 33 that are spot welded to the flat central portion of the carriage. A flange 38 extends inwardly from the vertical edge of each of the supports and is used in securing and positioning the lens. Any suitable means can be used for securing the lens to the lens supports, such as an epoxy cement. As another example, the lens could be screwed to the metal upright supports.

An additional suction cup 50 is part of a guide and locking structure used to provide steady support for the upper edge of the lens. The suction cup is attachable to the image plane as shown in FIGURE 1 and is secured to a slide rod 51. A rod mount 52 is secured to the top of lens 5 by means of as uitable adhesive, and is provided with central opening dimensions to loosely accommodate rod 51. This arrangement permits positioning of the lens toward and away from the image plane as the rod slides through the rod mount. A set screw 53 is threaded into the rod mount and is used to secure the top of the lens once properly focused.

While only one illustrative embodiment of the invention has been described in detail, it should be fully apparent to those skilled in the art that there are numerous possible variations within the scope of this invention. The invention is more clearly defined in the appended claims.

What is claimed is:

1. A reproportioning lens with a universal mounting attachable to an image plane upon which work to be copied is placed, comprising:
    a bed mount;
    means secured to said bed mount for detachably securing the same to an image plane upon which work to be copied is placed;
    a reproportioning lens including a pair of transparent face pieces spaced to form a cavity filled with a transparent liquid, at least one of said face pieces being curved to provide a reproportioning effect;
    a lens mount secured to said reproportioning lens and including a carriage slidably mounted for movement along said bed mount; and
    a focusing structure operative to control the distance between said lens and the image plane, said lens remaining parallel to said copy work regardless of position.

2. Apparatus in accordance with claim 1 wherein said means for detachably securing said bed mount to the image plane comprises at least one suction cup.

3. Apparatus in accordance with claim 2 further comprising:
    a slide rod having a suction cup attached to one end thereof and adapted for securing to the image plane; and
    means slidably securing said rod to said lens at a point spaced from said lens mount so that said lens is free to move parallel to said bed mount during focusing adjustments.

4. A reproportioning lens with a universal mounting attachable to an image plane upon which work to be copied is placed comprising:
    a reproportioning lens including
        a pair of spaced apart transparent face pieces at least one of which is curved to provide a reproportioning effect,
        means secured between said face pieces to provide a lens cavity between said face pieces, and
        a transparent liquid filling said cavity;
    a bed mount;
    a pair of suction cup devices secured to said bed mount for detachably securing said bed mount to the image plane to provide a bed surface perpendicular to the image plane;
    a lens mount including
        a carriage slidably mounted for movement along said bed surface, and
        means for securing said lens to said carriage in a position perpendicular to said bed surface and parallel to the image plane;
    a focusing and locking structure including
        a rack and pinion unit between said bed mount and carriage for positioning the carriage, and
        means for frictionally securing said carriage to said bed mount when a desired position for the lens has been achieved; and
    a guide and locking structure secured to said lens at a point spaced from said carriage and including
        an additional suction cup attachable to the image plane and slidably secured to said lens, and
        means for fixedly securing said additional suction cup to said lens when a desired position for the lens has been achieved.

References Cited

UNITED STATES PATENTS 3,146,662   9/1964   Pettis _____ 88—24

NORTON ANSHER, *Primary Examiner.*

RICHARD A. WINTERCORN, *Asistant Examiner.*